United States Patent [19]
Burdorf

[11] 3,979,037
[45] Sept. 7, 1976

[54] AIR GUIDE FOR TAPE TRANSPORTS

[75] Inventor: Donald L. Burdorf, Newport Beach, Calif.

[73] Assignee: BASF Aktiengesellschaft, Ludwigshafen (Rhine), Germany

[22] Filed: Nov. 7, 1974

[21] Appl. No.: 521,882

[52] U.S. Cl. .................................. 226/97; 226/196
[51] Int. Cl.² ........................................ B65H 17/32
[58] Field of Search .......... 226/196, 197, 198, 199, 226/97; 360/162

[56] References Cited
UNITED STATES PATENTS

| | | | |
|---|---|---|---|
| 3,087,664 | 4/1963 | Streeter | 226/97 |
| 3,103,850 | 9/1963 | Khoury et al. | 226/97 X |
| 3,281,040 | 10/1966 | Grant | 226/196 X |
| 3,421,675 | 1/1969 | Brown et al. | 226/196 |
| 3,469,752 | 9/1969 | Amos et al. | 226/97 X |

Primary Examiner—Allen N. Knowles
Attorney, Agent, or Firm—Johnston, Keil, Thompson & Shurtleff

[57] ABSTRACT

An apparatus for guiding a span of high speed magnetic tape past the recording/transducing head which utilizes a low volume lubricating air film to virtually eliminate the sliding friction between the guide itself and the magnetic tape. The periphery of the guide is slightly concave to permit the formation of an air film while permitting the tape to retain a desirable flat cross section and also facilitating a seal between the edges of the tape and the convex peripheral surface of the guide to isolate the lubricating air film from the atmosphere in order to reduce the supply of compressed air required. The design also enables the utilization of boundary layer air being dragged along by the tape to supplement the compressed air supply to further reduce the volume of air required.

4 Claims, 4 Drawing Figures

AIR GUIDE FOR TAPE TRANSPORTS

BACKGROUND

Magnetic recording tape is subject to wear as it is directed by stationary guide means such as are used in many tape transport mechanisms. The problem is intensified when processing video signals because of the extremely high tape speeds involved and, consequently, the multiplicity of tracks which must be used to record or playback a program of convenient length in a manageable length of tape. For example, in a system which operates at a tape speed of 120 inches per second, 36,000 feet of tape pass the transducing head each hour. Due to physical limitations in reel size, it is well known to record the data on a multiplicity of parallel tracks and to repeatedly pass the shorter length of tape past the transducer, each time reading information from a different track. In this manner a 1200 foot reel of tape having 30 tracks can be used to record or playback a 60 minute program on the above-described system. The requirement that the tape pass through the transport 30 times per program, however, results in the serious wear considerations mentioned above.

Guides utilizing a film of air as a lubricant are well known in the art. Known guides, however, have serious disadvantages.

One type of known guide has a guiding periphery which is linear across the width of the tape and has openings along the periphery through which compressed air is passed to create a lubricating film of air. Typically single ports placed along the guide periphery at the centerline of the tape path are used. Such configuration makes it likely that an unequal pressure distribution across the width of the tape will be generated. Given the linear configuration of the guide, the higher pressure at the centerline of the tape will cause the tape to "bulge." Since, by their nature, tape guides direct the tape through a curved path, the "bulging" causes undesirable deformation of the tape as a result of the requirement that it flex in two planes simultaneously. As a related consequence the tape in resisting the deformation tends to "squeeze" the air film out unless significant pressure is maintained at the air inlet ports. As the pressure is increased, the volume of compressed air required is also increased, due to the leakage between the tape edges and the guide. The leakage can be reduced by maintaining close tolerance between the edges of the tape and guiding flanges of the guide but this approach introduces at least two further disadvantages. Not only is the manufacturing cost of both the tape and the guide increased as a result of the tighter tolerances, but edge wear is likely to be encountered. This wear is especially undesirable when using tape having a large number of parallel tracks requiring highly accurate lateral positioning of the tape.

To overcome some of the above disadvantages, multiplicity of ports across the width of the tape having varying sizes and/or varying inlet pressures is known to produce a more uniform pressure distribution. The use of this technique, however, increases the manufacturing costs significantly.

An alternative means of producing a more uniform pressure across the width of the tape and also along the path of the tape is through the use of air pockets instead of simply ports through which compressed air is introduced between the tape and the guide. Although more uniform pressure is achieved in this manner, it has been either at the cost of significantly increased air consumption or through a relatively complex design and the associated higher manufacturing costs.

OBJECTS AND SUMMARY OF THE INVENTION

It is an object of the present invention to provide an air guide for magnetic tape which eliminates excessive surface and edge wear while maintaining a nearly linear tape cross section.

Another object of this invention is to provide an effective air guide for magnetic tape with a simplified design to reduce manufacturing costs.

A further object of this invention is to provide an air guide for magnetic tape which can be operated with a minimal supply of low pressure compressed air.

An additional object of this invention is to provide an air guide which will operate satisfactorily in the event of a short duration failure in the compressed air supply.

The tape guide in this invention has a slightly concave peripheral surface. Compressed air is supplied through air ports along the tape path at the tape centerline. The air pressure is maintained at a level, determined at least in part, by the physical characteristics of the tape and the tape speed, adequate to keep the tape nearly linear across its width. The tape edges seat gently against the outermost surfaces of the concave periphery to seal the air cushion from the atmosphere. Guiding flanges, spaced slightly further apart than the width of the tape serve to maintain the proper lateral positioning of the tape, although the concave configuration of the guiding edge tends to automatically center the tape within the guide.

The design enables the use of lower air pressure than required in known guide as a result of the maintenance of a flat tape cross section. The lower air pressure not only significantly reduces the volume of air required but also permits utilization of the boundary layer air to augment the compressed supply of air to even further reduce the necessary capacity of the air pump.

In addition the relatively slight degree of concavity required to provide adequate tape lubrication with a guide of this type has a distinct advantage over other guides utilizing air pockets. Although wear will naturally increase if the compressed air supply is cut off, tests indicate that the concave design lends itself to utilization of the boundary layer air being dragged along by the tape to provide at least some degree of lubrication. Furthermore, failure of the compressed air supply with the consequent settling of the tape further into the concave guide face would not subject the tape to excessive distortion and stress because of the shallowness and smoothness of the recess.

THE DRAWINGS

DETAILED DESCRIPTION OF THE INVENTION

Figure 1:
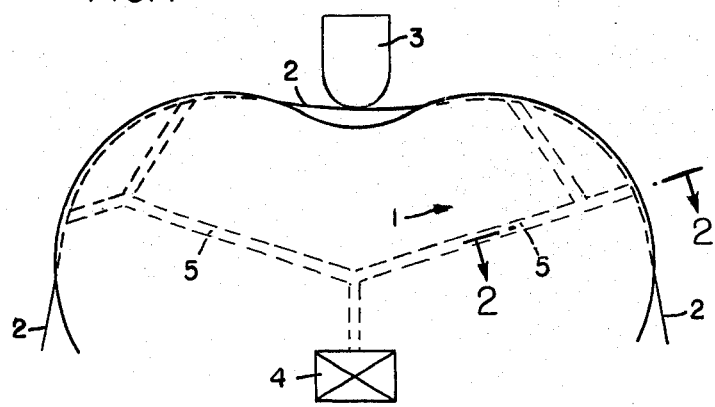
FIG. 1 is a top view of the air guide.

A preferred embodiment of the air guide is shown in FIG. 1. Guide 1 defines the path of tape 2 along the guide and past transducer head 3. It should be noted that tension in the span of tape between the two edges of the guide is required to maintain contact pressure between head 3 and tape 2. A method and means for generating such tension is disclosed in pending U.S. application Ser. No. 388,929, filed Aug. 16, 1973.

Figure 2:
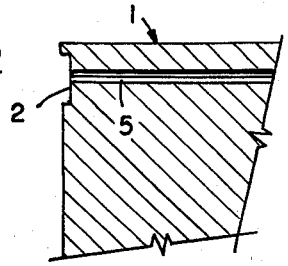
FIG. 2 is a cross section of the air guide and tape taken at line 2—2 in FIG. 1.
Figure 3:
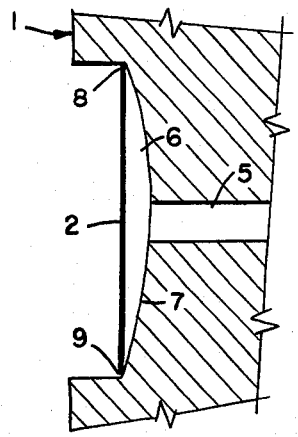
FIG. 3 is an enlarged portion of the view in FIG. 2 illustrating the air film and the nearly linear tape cross section.

The design of the guide is symmetrical with respect to the head to permit bidirectional transport of the tape. Compressed air to generate the lubricating air film is supplied at four locations along the periphery of the guide. FIG. 2 illustrates in detail a typical air port. Compressed air from pump 4 passes through tube 5 and into the space between the tape 2 and the guide 1. FIG. 3 illustrates the air film 6 thus generated between tape 2 and guide surface 7. Note that, except at the extreme edges 8 and 9 of tape 2, the tape cross section is nearly linear.

This optimum configuration can be achieved by matching the guide configuration to the tape and the operating characteristics of the tape transport to be used. For example, a guide having a lobe radius of one inch, a peripheral surface ground concave to a 15 inch radius with a surface finish of 32 performed highly satisfactorily with 0.25 mil, ¼ inch tape being transported under 2 ounces of tension at a speed of 120 inches per second. Air pressure of 20 inches of water was used, resulting in an air flow of approximately 1.0 cubic feet per hour. Measurements indicated that approximately 10 thousandths of an inch along each edge of the tape contacted the guide surface. By increasing the air pressure, and, consequently, the air flow, the amount of contact could be further reduced or eliminated. The pressure and air flow used in the experiments proved advantageous, however, in that an inexpensive air pump of the type used to oxygenate fish tanks is adequate to meet the performance requirements.

Figure 4:
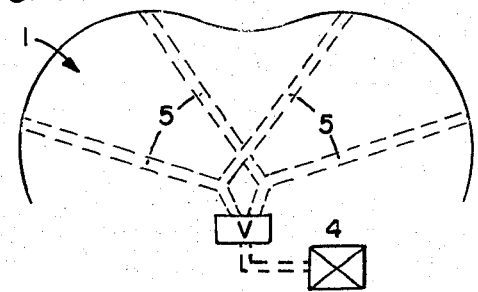
FIG. 4 is a diagram of an air valve system which can be used to reduce the compressed air requirements.

An even further reduction of the required compressed air capacity can be made by incorporating a valving system as illustrated in FIG. 4 into the tubes 5. This management permits the shutting off of the downstream port in each lobe during the tape transporting operation. Upon reversal of the direction of the tape valves are activated to supply air to the ports previously shut off and to simultaneously shut off those ports previously supplied with compressed air. In this manner the compressed air requirement is reduced although an additional switching circuit is required to retain the bidirectional capability of the guide.

It should be recognized that variations from the embodiments described in detail may be made without departing from the scope and spirit of the appended claims.

I claim:

1. An air guide apparatus adapted to guide a span of recording tape as it is transported past a head, said apparatus comprising:

a concave guide surface;
    a pair of flanges spaced apart a distance slightly greater than the width of the recording tape and located on opposite sides of the path to be followed by said tape along said guide surface;
    at least one air port, having a means for providing air under pressure connected thereto, located in said guide surface substantially at the point where a pressurized air film is sought to be initiated;
    said guide surface being located adjacent to said head whereby, as said tape travels along and is guided by said guide surface and between said flanges, a film of pressurized air is generated between said guide surface and tape in the direction of tape travel along said guide surface which effectuates a reduction in sliding friction therebetween and maintains a substantially linear profile of said tape across its width as it is transported past said head.

2. The apparatus of claim 1 wherein said guide apparatus is bidirectional through the use of at least two air ports, the first of said air ports being located in said guide surface substantially at the point where a pressurized air film is sought to be initiated as said tape is transported in a first direction, and the second of said air ports being located in said guide surface substantially at the point where a pressurized air film is sought to be initiated as said tape is transported in the opposite direction.

3. The apparatus of claim 2 further comprising a means for disconnecting said second air port from said pressurized air providing means when said tape is transported in the first direction, and said first air port from said pressurized air providing means when said tape is transported in the opposite direction.

4. An air guide apparatus adapted to guide a span of recording tape as it is transported past a head, said apparatus comprising:

a concave guide surface;
    a pair of flanges spaced apart a distance slightly greater than the width of the recording tape and located on opposite sides of the path to be followed by said tape along said guide surface;
    at least one air port, having a means for providing air under pressure connected thereto, located in said guide surface substantially at the point where a pressurized air film is sought to be initiated;
    said guide surface being located adjacent to said head whereby, in the event of a failure of said pressurized air providing means, said concave guide surface prevents harmful deformation of said tape and facilitates the generation of a boundary layer of air film between said guide surface and tape which serves to reduce the sliding friction therebetween.

* * * * *